United States Patent

[11] 3,617,514

| [72] | Inventor | Clifford H. Marlar<br>Corpus Christi, Tex. |
|---|---|---|
| [21] | Appl. No. | 882,867 |
| [22] | Filed | Dec. 8, 1969 |
| [45] | Patented | Nov. 2, 1971 |
| [73] | Assignee | Sun Oil Company<br>Philadelphia, Pa. |

[54] USE OF STYRENE REACTOR BOTTOMS IN DELAYED COKING
5 Claims, 1 Drawing Fig.

| [52] | U.S. Cl. | 208/131, 208/46 |
|---|---|---|
| [51] | Int. Cl. | C10g 9/14 |
| [50] | Field of Search | 208/131, 46, 106 |

[56] References Cited
UNITED STATES PATENTS

| 1,966,801 | 7/1934 | Lord | 208/106 |
|---|---|---|---|
| 2,922,755 | 1/1960 | Hackley | 208/106 |
| 3,498,906 | 3/1970 | Bogart et al. | 208/131 |

*Primary Examiner*—Herbert Levine
*Attorneys*—George L. Church, Donald R. Johnson, Wilmer E. McCorquodale, Jr. and Frank C. Hilberg, Jr.

ABSTRACT: The use of heavy bottoms or styrene tar (containing sulfur and tertiary butyl catechol) from a dehydrogenation reactor for producing styrene from ethylbenzene, as part of the make up feed in a delayed petroleum coking operation. The styrene tar as obtained from the dehydrogenation reactor is mixed with a diluent such as light cycle oil, and fed to a coker along with preheated petroleum coking stock.

PATENTED NOV 2 1971
3,617,514
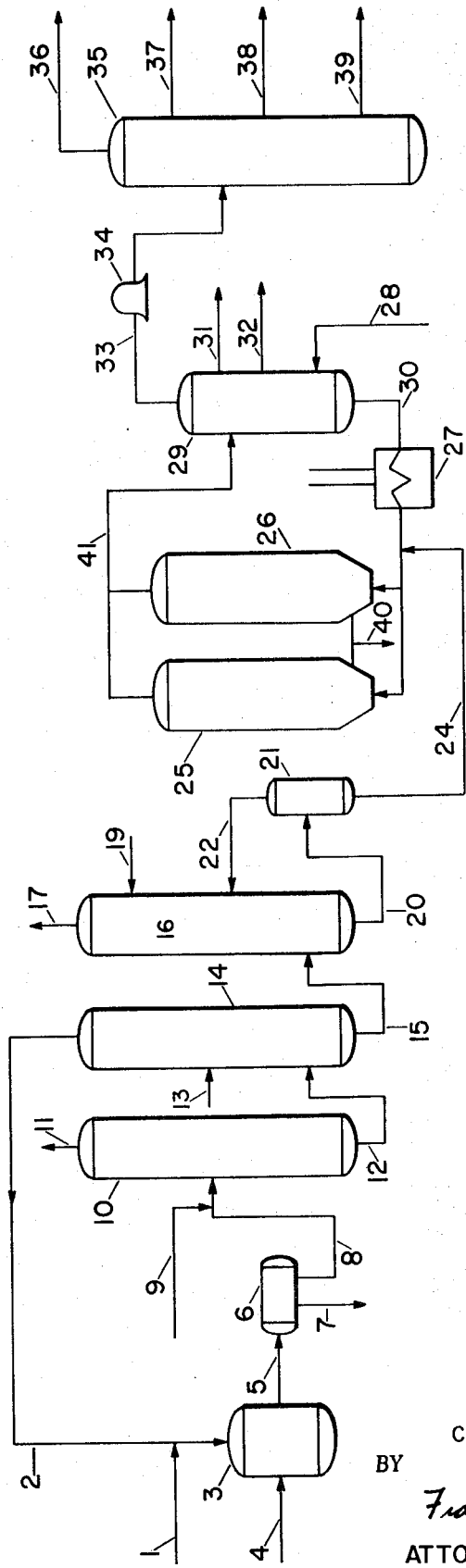
INVENTOR.
CLIFFORD H. MARLAR
BY
Frank C. Hilberg jr.
ATTORNEY

USE OF STYRENE REACTOR BOTTOMS IN DELAYED COKING

BACKGROUND OF THE INVENTION

When producing styrene from ethylbenzene, a tar is produced as a byproduct, which tar has heretofore been considered as useless and has been dumped as waste material.

SUMMARY OF THE INVENTION

It has now been found that through the use of the present invention it is possible to make use of this styrene tar in the production of gas oil, gasoline, coke, and various light hydrocarbon gases. In accordance with the present invention, the styrene tar is mixed with a light oil and fed to a delayed coker along with petroleum coking stock which is generally a distillation residuum.

DESCRIPTION OF THE DRAWING

The drawing is a flow sheet of the overall processes of which the present invention is a part.

In carrying out the overall process ethylbenzene in stream 1 is charged with recycle material in stream 2 to dehydrogenation reactor 3 along with superheated steam in stream 4. The dehydrogenation takes place at low pressure and a high mole ratio of steam to ethylbenzene. Styrene and other products formed by the reaction are removed from the dehydrogenation reactor 3 in stream 5 and flow to settler 6 where condensate is removed from the system as stream 7. The hydrocarbon stream 8 is mixed with sulfur stream 9 and charged to a distillation column 10 where the small amount of benzene and toluene formed by cracking in the dehydrogenation reactor is removed as stream 11. The bottom stream 12 from this column and sulfur in stream 13 fed to ethylbenzene recycle column 14 where recycle ethylbenzene goes overhead back in stream 2 to reactor 3. The bottom stream 15 from ethylbenzene column 14 flows to styrene column 16 where the final purification of styrene is made. Sulfur is added to distillation column 10 and the ethylbenzene recycle column 14 in order to prevent polymerization of styrene. Tertiary butyl catechol is added as stream 19 to the styrene column 16 to prevent polymerization. Tar, sulfur, tertiary butyl catechol, and a small amount of styrene flows as stream 20 from the bottom of the styrene column 16 to a stripping column 21 where most of the styrene is removed as stream 22 from the tar.

A further description of the performance of this dehydrogenation unit may be found in U.S. Pat. No. 2,495,278 issued Jan. 24, 1950 to Joseph E. Nichols.

The styrene tar flowing from the bottom of the stripping column 21 has the following typical composition: 10 to 19 weight percent total sulfur, 3 to 6 weight percent elemental sulfur, 1 to 6 weight percent styrene, and 20 to 50 weight percent polymer. The composition of the styrene tar can vary due to the frequency of styrene withdrawal, rate of sulfur injection, efficiency of the stripper, and operation of the styrene dehydrogenation unit. Generally a diluent is mixed with the styrene tar to facilitate handling thereof. Normally the diluent is an oil and is present in an amount of from 20 to 35 weight percent of the total composition with from 25 to 30 weight percent of the total composition being the preferred range. The diluent used preferably is light catalytic cycle oil, however, any oil having a low viscosity and not containing any components which boil at a temperature equal to or lower than styrene may be used. The diluent oil should also have good solubility characteristics toward polymer and sulfur. The light cycle oil generally is from a catalytic cracker and preferably has a substantial fraction boiling in the range of from 400° and 800°F. and API gravity of from 15° to 35°.

The styrene tar flows as stream 24 from the stripping column 21 to the coking drums 25 and 26 where it is combined with a petroleum residuum being charged to the delayed coker. Generally the tar is maintained at an elevated temperature such as between 150° to 200° F. to prevent precipitation of the polymer and sulfur. The tar is charged downstream of furnace 27 in order to avoid coking problems in the furnace tubes. Coker feed stream 28 is charged to main column 29 and flows as stream 30 from the bottom of this column through the furnace 27 and into the coke drums 25 and 26. The coker feed may range in gravity from 5° to 20° API and have a Conradson Carbon from 5 to 50 percent. Coker feed stock is normally obtained from petroleum distillation of crude oil, however, catalytically cracked slurry oil may be also used as coker feed. Generally the coker feed is a residuum boiling above about 800°F. Generally the tar can be blended with the petroleum residuum in an amount of from 0.1 to 1.0 weight percent as based on the overall composition. The petroleum residuum is heated to coking temperature in furnace 27. The cracked hydrocarbons flow from the coke drums 25 and 26 to the main column 29 where heavy gasoline stream 31 and gas oil stream 32 are separated out. The light hydrocarbons pass as overhead stream 33 through a compressor 34 to the vapor recovery 35 where they are separated into fractions such as light hydrocarbons (hydrogen, methane, ethane, ethylene) stream 36, propane-propylene stream 37, butane, butylene stream 38 and light gasoline stream 39. The coke drums 25 and 26 are operated at a temperature between 850° to 1,050° F. and under a pressure from 10–100 p.s.i.g. Residence time in the coke drum generally is between 1 and 10 minutes. The coke drums are operated in parallel so the coke can be removed as stream 40 from one while the other is in operation. Volitales are removed from coke drums 25 and 26 as stream 41 which is fed to main drum 29.

DESCRIPTION OF THE PREFERRED EMBODIMENT

A styrene tar is withdrawn from an ethylbenzene dehydrogenation unit and blended with a light cycle oil to yield a composition containing approximately 14.5 weight percent sulfur of which 4.5 wt. percent is in the form of elemental sulfur, 3.5 wt. percent styrene, 35 wt. percent styrene polymer, and 27.5 percent light cycle oil, a trace of tertiary butyl catechol, and the remainder principally miscellaneous hydrocarbons. The light cycle has a boiling range from 400° to 800° F. and an API gravity of about 25°. The cycle oil serves to maintain the sulfur and tar in solution and to permit easy pumping of the solution. The temperature of the composition is maintained at approximately 175° F. One part of this composition is blended with 99 parts of a petroleum coking stock residuum boiling at over 800° F. which has been preheated to 950° F. The thus formed composition is charged to a delayed coker and coked at 950° F. for 5 minutes at 50 p.s.i.g. The following products are obtained: light hydrocarbon gases (hydrogen, methane, ethane, propane, propylene butane, and butylene) −20 wt. percent, gasoline (having a boiling range between 100° and 400° F.) −20 wt. percent, gas oil (having a boiling range between 400° and 800° F.) −30 wt. percent, petroleum coke −30 wt. percent.

The invention claimed is:

1. A coking process comprising blending a styrene tar with a petroleum residuum boiling at above 800° F. which petroleum residuum has been heated to from 850° to 1,050° F. to form a blend containing from 0.1 to 10 weight percent as based on the total composition of said styrene tar, charging the thus formed blend to a delayed coker and coking said blend at from 850° to 1,050° F., for from about 1 to 10 minutes under a pressure of from 10 to 100 pounds per square inch gauge.

2. The process of claim 1 wherein the styrene tar is obtained from an ethylbenzene dehydrogenation unit.

3. The process of claim 2 wherein the styrene tar is blended with from 20 to 35 weight percent as based on the total composition of an oil boiling in the range of from about 400° to 800° F. and having an API gravity of from 15° to 35°.

4. The process of claim 3 wherein the blended oil and styrene tar is maintained at from 150° to 200° F. prior to blending with the petroleum residuum.

5. The process of claim 4 wherein the petroleum residuum has an API gravity of from 5° to 20° and a Conradson carbon content of from 5 to 50 percent.